March 12, 1946.  A. E. NILSSON  2,396,526
SEPARATOR FOR DUST OR OTHER SOLID IMPURITIES
Filed Sept. 14, 1943
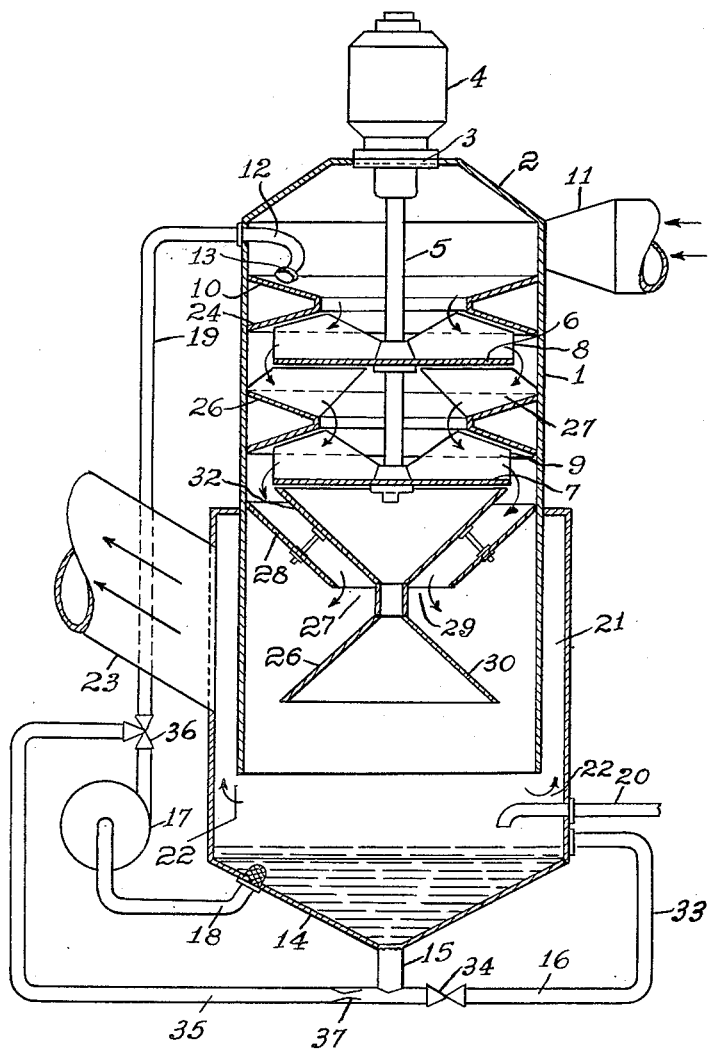
Inventor:
Axel Edvin Nilsson.
Attys.

Patented Mar. 12, 1946

2,396,526

UNITED STATES PATENT OFFICE 2,396,526

SEPARATOR FOR DUST OR OTHER SOLID IMPURITIES

Axel Edvin Nilsson, Gustavsberg, Sweden

Application September 14, 1943, Serial No. 502,239
In Sweden February 4, 1942

1 Claim. (Cl. 183—26)

The present invention relates to a device for the separation of dust or other solid impurities from a gaseous or vaporous medium by treatment with a liquid.

In accordance with a known method, such a purification of gases by means of liquids is effected by the use of apparatus consisting essentially of tower-like containers with liquid-sprayers centrally arranged therein and with liquid-collectors placed at the walls. In this known apparatus the liquid is introduced at the top of the container, whilst the gas or vapour is forced through the container in a reverse direction to the liquid. As a washing liquid, water is usually employed, especially for the separation of dust or similar impurities.

For certain purification purposes, however, these separators do not work satisfactorily. This is the case, for example, in regard to stone dust, or the dust formed at works for the making of porcelain or other ceramic products, where, in view of the injurious nature of such dust, the purification of the air therefrom is of the greatest importance. It has been found that it is very difficult completely to eliminate these kinds of dust by washing with water, as a large number of the particles elude moistening by the liquid and pass through the purifying apparatus without separation. The removal of the said kinds of dust by treatment with water or the like is, however, advantageous as compared with separation by the dry process, in that the moistened dust is effectively bound by the liquid, whence the removal of the separated dust does not present any difficulties, whether from a sanitary or other point of view.

The invention is based on the observation that, in order to attain satisfactory results, it is necessary, by some suitable means, to render the washing water more viscous. This increase of the dustbinding capacity of the washing liquid is most simply effected by causing it to absorb a certain amount of dust: that is to say, the gas leaves the apparatus after being washed with liquid which has already bound so much dust that the required viscosity has been attained. The separator in accordance with the invention is therefore designed in accordance with the principle of unidirectional flow, and consists of a container, in the upper part of which the liquid and the gas or vapour are supplied, whereupon the liquid passes through the separator with a falling-motion, whilst the gas or vapour is sucked through the separator by means of fan wheels arranged under one another in the centre of the container. During their rotation the said wheels atomize or finely diffuse the liquid, fling it outwards and closely mix it with the gas or vapour; after each such projection, the media are returned to the centre of the separator by means of collecting funnels arranged under the fan wheels. By causing the washing liquid to circulate and by supplying the separator merely with sufficient liquid for the removal of the separated dust, the separating effect—owing to the fact that the entering gas or vapour is being treated with a liquid of high viscosity—can be further enhanced and the total consumption of liquid be reduced, so that it amounts merely to about one-hundredth per cent by volume, reckoned on the basis of the purified air.

One embodiment of the invention is illustrated on the accompanying drawing, which diagrammatically shows a separator with a circulation device for the washing liquid.

In the example shown, the cylindrical container 1 of the separator is provided at the top with a lid 2, carrying a base-plate 3 for an electric motor 1. In the base-plate a shaft 5 is journalled and driven by the motor through a coupling. The shaft carries two fan wheels 6 and 7, which are provided with mainly radially disposed flanges or vanes 8 and 9 respectively. For carrying the gas and the liquid to the centre of the fan wheels, a collecting funnel 10 is arranged at the wall of the container. The polluted air is sucked in through an inlet 11, and the washing liquid is supplied through a tube 12, which is provided with one or more spray nozzles 13, so arranged relatively to the sloping side of the collecting funnel 10 that an effective clearing of the walls of the funnel from any dust deposited thereon is always attained. The container is provided with a bottom part 14, which serves as a vessel for the collection of the downward flowing washing liquid. The liquid mingled with dust is discharged through a tapping-tube 15 and a drain 16 into a separator basin, tank or the like, not shown, with a view to possible recovery of the dust. By a centrifugal pump 17 or the like the said liquid in the vessel 14 is also returned through a piping 18, 19 to the tube 12 for the supply of the liquid at the top of the container. By means of the pump 17 or the like, a suitable pressure can also be obtained in the spray nozzles 13. Fresh washing liquid is supplied to the separator through a pipe 20, which discharges itself into the collecting vessel in the bottom part 14 of the separator. The lower part of the container 1 is provided with a jacket 21, which at the bottom, through an opening 22, is connected with the collecting vessel 14, and at the upper part is provided with an outlet 23 for the purified air. By the arrangement of such a jacket, the velocity of the gas in the lowest part of the separator is reduced, so that the purified gas or vapour escaping from the separator is entirely freed from mechanically carried liquid.

The separator operates in the following manner. The fan wheels 6, 7 rotating at high speed suck in the air, with the impurities which are to be separated therefrom, through the inlet 11. With the aid of the conical collecting funnel 10 arranged above the fan wheel 6, the air is led towards the central part of the wheel. Here the air meets a jet of water from the nozzle or nozzles 13, whereupon the air, together with the lashed water, is flung out by the fan vanes 6, 7 towards the wall surface of the cylindrical container. The collecting funnel 10 is provided with a conically sloping lower side 24, whereby the direction of movement of the rotating mixture of fluid and air is diverted somewhat downwards. The vanes 8 of the fan wheel 6 are bevelled at the top in correspondence with the slope of the conical lower side 24 of the collecting funnel 10, and at their attachment to the shaft 5 are obliquely cut in the direction of the latter. The constriction thus produced tends to increase the pressure of the mixture of liquid and air on its projection.

By the collecting funnel 26, arranged above the fan wheel 7, the mixture is now returned towards the centre. The conical upper side of the collecting funnel 26 is provided with a number of radially disposed upwardly directed flanges 27, whereby the rotary movement of the mixture of liquid and air is retarded. The retardation effected by these flanges or "catches" results in a whirling movement of the mixture, which has been found to facilitate the absorption of the impurities by the liquid, as the dust-containing air bubbles in the mixture are thereby broken up to such an extent that the moistening of the particles of dust is ensured. With the aid of the fan wheel 7, the liquid is again lashed, so that the air and the liquid are still more closely mixed. The rotary movement of the mixture is maintained, when, as a continuous film, it is carried down along the sides of the conical collecting funnel 28, arranged under the fan wheels 7. During this rotary movement the liquid is showered down from the mouth 29 of the funnel, and during its progress frees the air completely from its impurities. The purified air escapes through the outlet 23.

A separator designed in accordance with the invention is but little affected by variations in the load, whence, without loss of efficiency, it can separate considerably larger amounts of dust than what it is normally intended for. The efficiency of the separator can obviously be enhanced by arranging a larger number of fan wheels; but this object can be attained also in another way, namely by introducing a device which will prolong the rotary movement of the mixture of liquid and air which is being carried down along the lower collecting funnel 28. Such a device may, for example, take the form of a downwardly directed, conical spray device 30, which, directly or through an intermediate member 31 situated in the mouth of the funnel, passes into a second funnel 32 conically diverging upwards, the upper edge of which being slightly spaced from the fan wheel 7. By means of this device, which, for example, may be supported by rods or bolts arranged on the collecting funnel 28, the mixture of liquid and air maintains its rotary movement along the spray device 30, so that the time during which the liquid and the air, whilst being rotated and whirled about, are in touch with one another is prolonged. The conical funnel 28 serves for the purpose of obviating eddies in the gas chamber above the spray device 30, which will also tend to increase the resistance of pressure in the separator.

In the example shown, where the washing liquid is circulated by means of a pump, the separator is supplied merely with so much water as is required for the removal of the separated dust. With a view to obtain a uniform operation of the separator, it is desirable that the level of the liquid in the collecting vessel 14 should be kept constant: this can be regulated, for example, by an overflow pipe 33, which discharges itself into the drain 16, or possibly by the automatic regulation of the fresh water supply. The tapping-tube 15 in the bottom of the collecting vessel communicates through a valve 34 with the drain 16, and through a piping 35, via a threeway cock 36, with the discharge pipe 19 of the pump. If, by means of the threeway cock 36, the feed pipe 19 is closed, whilst the piping 35 is opened, a circulation in the reverse direction may, if required, be effected through the tapping-tube 15, whereby the latter can be cleared from any slime which may have been deposited and got packed together. In order to increase the pressure during this rinsing, the piping 35, immediately before its junction with the tapping-tube, is provided with an ejecting device 37.

It has already been indicated that in the case of such injurious kinds of dust as silicon or porcelain dust, etc., the separation of the dust by a wet process is manifestly advantageous; and, as it is removed with the waste water without additional cost, the separator possesses great advantages from an economic point of view. Owing to the mode of operation of the separator, it can work quite continuously, no interruption being necessary for cleaning purposes. The amount of water supplied is, in fact, quite sufficient to rinse the unit during operation and keep it clean.

The separator can be used for the elimination of dust and impurities of greatly varying size, from relatively large grains down to particles of some tenths of micromillimeters ($\mu$) in magnitude. It can be made in any size, from that of an ordinary household vacuum cleaner and upwards. Thus, in certain establishments, it may be desirable to use a portable separator, in which case it will merely be necessary to arrange hose connections for the water supplied and discharged.

What I claim is:

Apparatus for separating dust and the like from a gaseous or vaporous medium having, in combination, a vertically extending chamber, a plurality of vertically spaced downwardly inclined baffle means each extending across said chamber and having an opening adjacent the vertical axis of said chamber, a plurality of fans one arranged below each of said baffle means in closely adjacent relation thereto, said fans having their inlets adjacent the said openings of said baffle means and having radially extending fan blades rotatable about said axis, means for entering the dust containing medium into said chamber above the uppermost of said baffle means, means for entering washing liquid into said chamber above the uppermost of said baffle means for successive flow over the upper sides of the latter to said openings, said fans acting to suck said medium into said chamber and to fling the washing liquid outward from adjacent said axis toward the lateral walls of said chamber to diffuse said liquid and mix it with said medium and force the mixture toward the bottom of said chamber, said baffle means acting to direct the outwardly flung mixture from one fan to the inlet of the fan immediately below it, and further baffle means being provided below the lowermost fan for directing the mixture outwardly flung by that fan toward the center of the chamber for promoting whirling of the mixture whereby to promote separating of the dust free gaseous constituent from the dust containing liquid constituent of the mixture, means for discharging said dust free constituent from the chamber, and means for returning a portion at least of the dust containing liquid constituent to the upper portion of said chamber for constituting at least part of the washing liquid for the gaseous medium entered into said chamber.

AXEL EDVIN NILSSON.